(12) United States Patent
Xu et al.

(10) Patent No.: US 11,503,320 B2
(45) Date of Patent: Nov. 15, 2022

(54) METHOD AND APPARATUS FOR VIDEO CODING

(71) Applicant: TENCENT AMERICA LLC, Palo Alto, CA (US)

(72) Inventors: Xiaozhong Xu, State College, PA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/569,159

(22) Filed: Jan. 5, 2022

(65) Prior Publication Data

US 2022/0132154 A1 Apr. 28, 2022

Related U.S. Application Data

(63) Continuation of application No. 16/867,615, filed on May 6, 2020, now Pat. No. 11,252,425, which is a continuation of application No. 16/203,224, filed on Nov. 28, 2018, now Pat. No. 10,687,071.

(60) Provisional application No. 62/626,571, filed on Feb. 5, 2018.

(51) Int. Cl.
| | |
|---|---|
| *H04N 19/186* | (2014.01) |
| *H04N 19/176* | (2014.01) |
| *H04N 19/14* | (2014.01) |
| *H04N 19/44* | (2014.01) |
| *H04N 19/159* | (2014.01) |

(52) U.S. Cl.
CPC ............ *H04N 19/44* (2014.11); *H04N 19/14* (2014.11); *H04N 19/159* (2014.11); *H04N 19/176* (2014.11); *H04N 19/186* (2014.11)

(58) Field of Classification Search
CPC ...... H04N 19/44; H04N 19/14; H04N 19/159; H04N 19/176; H04N 19/186
USPC .................................................... 375/240.24
See application file for complete search history.

(56) References Cited

U.S. PATENT DOCUMENTS

| | | | |
|---|---|---|---|
| 11,012,715 B2 | 5/2021 | Zhang et al. |
| 2015/0103910 A1 | 4/2015 | Kwon et al. |
| 2015/0195526 A1 | 7/2015 | Zhu et al. |
| 2015/0264396 A1 | 9/2015 | Zhang et al. |
| 2016/0219298 A1 | 7/2016 | Li et al. |
| 2016/0227245 A1 | 8/2016 | Liu et al. |
| 2016/0330474 A1 | 11/2016 | Liu et al. |

(Continued)

FOREIGN PATENT DOCUMENTS

JP 2017-508345 3/2017

OTHER PUBLICATIONS

Office Action dated Nov. 30, 2021 in Japanese Patent Application No. 2020-563844.

(Continued)

*Primary Examiner* — Albert Kir
(74) *Attorney, Agent, or Firm* — ArentFox Schiff LLP

(57) ABSTRACT

An apparatus includes processing circuitry for video decoding. The processing circuitry locates luma units of a luma coding unit that are co-located with chroma units of a chroma coding unit, and then determines a popularity of an intra block copy mode in the luma units. Further, the processing circuitry determines a block vector for a chroma unit in the chroma coding unit when the popularity meets a requirement, and reconstructs at least one sample of the chroma unit according to the block vector.

20 Claims, 13 Drawing Sheets

(56) References Cited

U.S. PATENT DOCUMENTS

| | | |
|---|---|---|
| 2017/0054996 A1 | 2/2017 | Xu et al. |
| 2017/0094271 A1 | 3/2017 | Liu et al. |
| 2017/0195677 A1 | 7/2017 | Ye et al. |
| 2017/0280159 A1 | 9/2017 | Xu et al. |
| 2017/0295370 A1 | 10/2017 | Xu et al. |
| 2017/0310961 A1 | 10/2017 | Liu et al. |
| 2018/0103260 A1 | 4/2018 | Chuang et al. |
| 2018/0124394 A1* | 5/2018 | Xu .................. H04N 19/593 |
| 2019/0222859 A1 | 7/2019 | Chuang et al. |
| 2022/0279189 A1* | 9/2022 | Jang .................. H04N 19/186 |

OTHER PUBLICATIONS

X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, No. 4, pp. 409-419, 2016.

S. Liu, X. Xu, S. Lei and K. Jou, "Overview of HEVC extensions on screen content coding", APSIPA Transactions on Signal and Information Processing, SIP (2015), vol. 4, e10, p. 1 of 12.

R. Joshi, S. Liu, G. Sullivan, YK Wang, J. Xu, Y. Ye, "HEVC Screen Content Coding Draft Text 6", JCTVC-W1005, Proceeding of 23rd JCT-VC meeting, San Diego, CA, USA, Feb. 2016.

P. Lai, X. Xu, S. Liu, T.-D. Chuang, S. Lei (MediaTek), "AHG14: Intra Block Copy reference area for Wavefront Parallel Processing (WPP)", JCTVC-S0101, Proceeding of the 19th JCT-VC meeting, Strasbourg, France, Oct. 2014.

X. Xu, S. Liu, T.-D. Chuang and S. Lei, "Block Vector Prediction in Intra Block Copy for HEVC Screen Content Coding", Data Compression Conference (DCC), Apr. 2015.

X. Xu, T.-D. Chuang, S. Liu, S. Lei, "Non-CE2: Intra BC merge mode with default candidates", JCTVC-S0123, Proceeding of the 19th JCT-VC meeting, Strasbourg, France, Oct. 2014.

Y. Sun, S. Hsiang, J. Kim, Y. Chen, X. Xu, W. Zhu and S. Lei, "Improvements of HEVC SCC Palette Mode and Intra Block Copy", IEEE J. Emerg. Sel. Topics Circuits Syst., vol. 6, No. 4, pp. 433-445, 2016.

X. Xu, S. Liu and S. Lei, "On chroma motion vector derivation for intra block copy", JCTVC-U0077, Proceeding of the 19th JCT-VC meeting, Warsaw, Poland, Jun. 2015.

X. Xu, S. Liu, S. Lei, "On Reference Picture List Construction for Intra Block Copy", JCTVC-U0113, Proceeding of the 19th JCT-VC meeting, Warsaw, Poland, Jun. 2015.

X. Xu, S. Liu, C. Liu, S. Lei, Y.-K. Wang, K. Rapaka, V. Seregin, "On Storage of Filtered and Unfiltered Current Decoded Pictures", JCTVC-U0181, Proceeding of the 19th JCT-VC meeting, Warsaw, Poland, Jun. 2015.

X. Xu, S. Liu, S. Lei, "On intra block copy signaling and constraints", JCTVC-V0056, Proceeding of the 22nd JCT-VC meeting, Geneva, Switzerland, Oct. 2015.

X. Xu, S. Liu, S. Lei, "DPB considerations when current picture is a reference picture", JCTVC-V0057, Proceeding of the 22nd JCT-VC meeting, Geneva, Switzerland, Oct. 2015.

X. Xu, S. Liu, S. Lei, "Bug fix for DPB operations when current picture is a reference picture", JCTVC-W0077, Proceeding of the 23rd JCT-VC meeting, San Diego, CA, USA, Feb. 2016.

C.-C. Chen and W.-H. Peng, "Intra Line Copy for HEVC Screen Content Intra-Picture Prediction", IEEE Transactions on Circuits and Systems for Video Technology, vol. 27, Issue: 7, pp. 1568-1579, Jul. 2017.

J. An, H. Huang, K. Zhang. Quadtree plus binary tree structure integration with JEM tools, JVET-B0023, Joint Video Exploration Team (JVET). Feb. 2016.

Ma, "Restriction of CU sizes for Intra Block Copy", JCT-VC, Jun. 30, 2014 (Year: 2014).

The extended European search report dated Feb. 24, 2021 in corresponding European Patent Application No. 19748225.0 (9 pages).

Xu, et al., "Intra Block Copy for Next Generation Video Coding", 2018 IEEE International Conference on Multimedia & Expo Workshops (ICMEW), IEEE, Jul. 23, 2018 (Jul. 23, 2018), pp. 1-4, XP033453544 (4 pages).

Li, et al., "Description of SDR video coding technology proposal by Tencent", Joint Video Experts Team (JVET) of ITU-T SG 16 WP 3 and ISO/IEC JTC 1/SC 29/WG 11, 10th Meeting: San Diego, US, Apr. 10-20, 2018, XP030151198 (34 pages).

Gary Sullivan and Jens-Rainer Ohm, "Meeting notes of the 3rd meeting of the Joint Video Exploration Team (JVET)", Geneva, CH, May 26-Jun. 1, 2016 (73 pages).

* cited by examiner

METHOD AND APPARATUS FOR VIDEO CODING

INCORPORATION BY REFERENCE

This application is a continuation of and claims priority to U.S. patent application Ser. No. 16/867,615, filed on May 6, 2020, which is a continuation of U.S. patent application Ser. No. 16/203,224, filed on Nov. 28, 2018, now U.S. Pat. No. 10,687,071, which claims the benefit of priority to U.S. Provisional Application No. 62/626,571, "METHODS FOR INTRA PICTURE BLOCK COMPENSATION WITH SEPARATE CODING TREE HANDLING" filed on Feb. 5, 2018. The benefit of priority is claimed to each of the foregoing, and the entire contents of each of the foregoing are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 35 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide method and apparatus for video encoding/decoding. In some examples, an apparatus includes processing circuitry for video decoding. The processing circuitry locates luma units of a luma coding unit that are co-located with chroma units of a chroma coding unit, and then determines a popularity of an intra block copy mode in the luma units. Further, the processing circuitry determines a block vector for a chroma unit in the chroma coding unit when the popularity meets a requirement, and reconstructs at least one sample of the chroma unit according to the block vector.

According to an aspect of the disclosure, the processing circuitry determines the block vector for the chroma unit in the chroma coding unit based on the luma units when all the luma units are coded in the intra block copy mode. For example, the processing circuitry locates a specific luma unit that is co-located with the chroma unit in the chroma coding unit, and determines the block vector that is associated with the specific luma unit for the chroma unit.

According to another aspect of the disclosure, the processing circuitry determines the block vector for the chroma unit in the chroma coding unit based on the co-located luma units when a population percentage of the intra block copy mode in the luma units is above a first threshold. For example, when a specific luma unit that is co-located with the chroma unit is coded in the intra block code mode, the processing circuitry associates the block vector of the specific luma unit with the chroma unit; and when the specific luma unit that is co-located with the chroma unit is coded in a mode other than the intra block code mode, the processing circuitry determines the block vector according to a neighboring chroma unit for the said chroma unit. In an example, the processing circuitry decodes the first threshold from at least one of sequence parameter set (SPS), picture parameter set (PPS) and slice header. In some embodiments, the processing circuitry disables the intra block copy mode for the chroma coding unit when the population percentage of the intra block copy mode in the luma units is below a second threshold that is lower than the first threshold. In an embodiment, the processing circuitry disables the intra block copy mode for the chroma coding unit when at least one of the luma units of the luma coding unit is not coded in the intra block copy mode.

According to another aspect of the disclosure, the processing circuitry splits the chroma coding unit into chroma coding sub-units when a non-intra block copy mode exists in the luma units, and determines whether the respective chroma coding sub-units are decodable using the intra block copy mode. In an example, the processing circuitry detects a splitting flag associated with the chroma coding unit, and splits the chroma coding unit into the chroma coding sub-units in response to the splitting flag.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
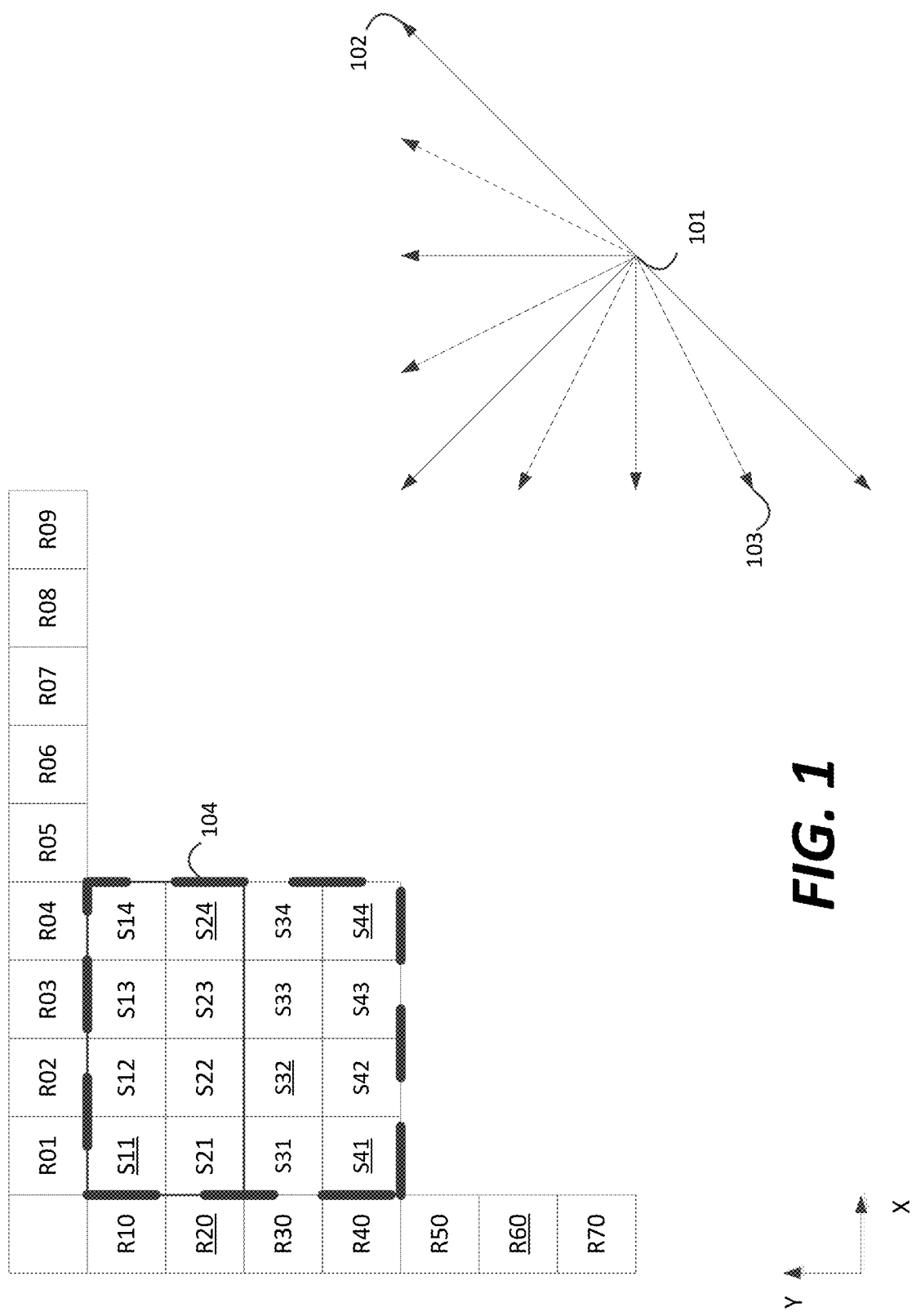
FIG. 1 is a schematic illustration of a subset of intra prediction modes.
Figure 2:
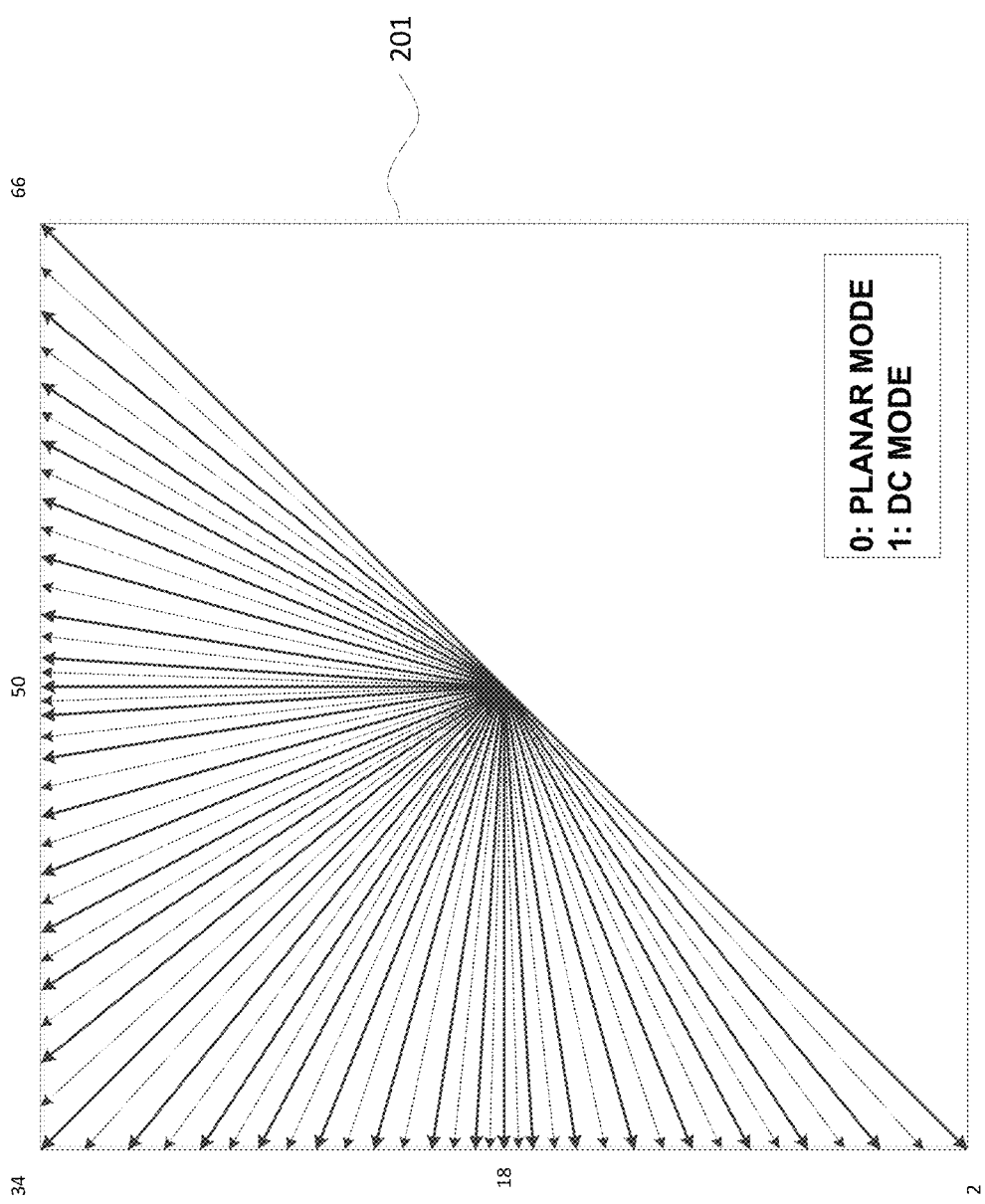
FIG. 2 is an illustration of intra prediction directions.
Figure 3:
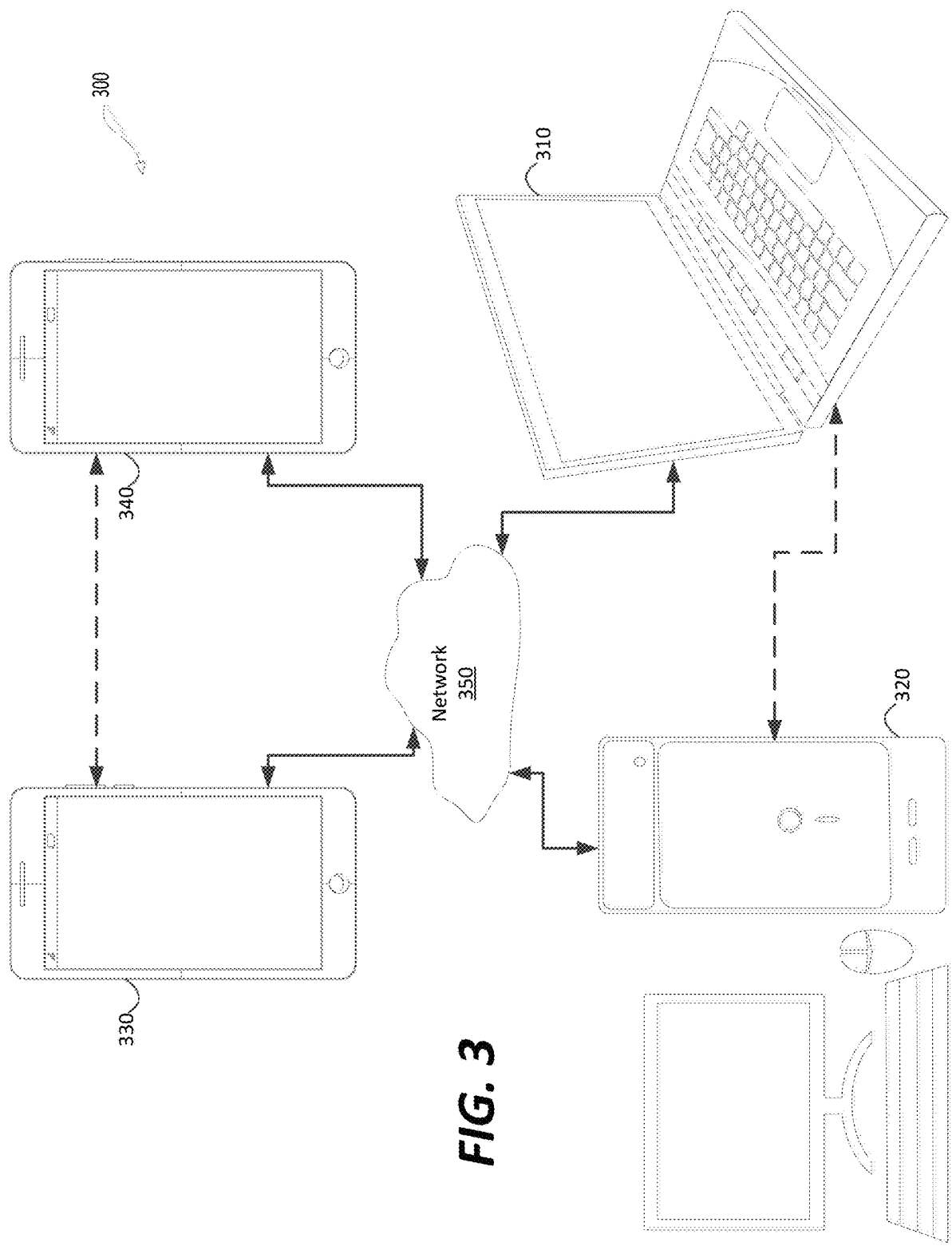
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
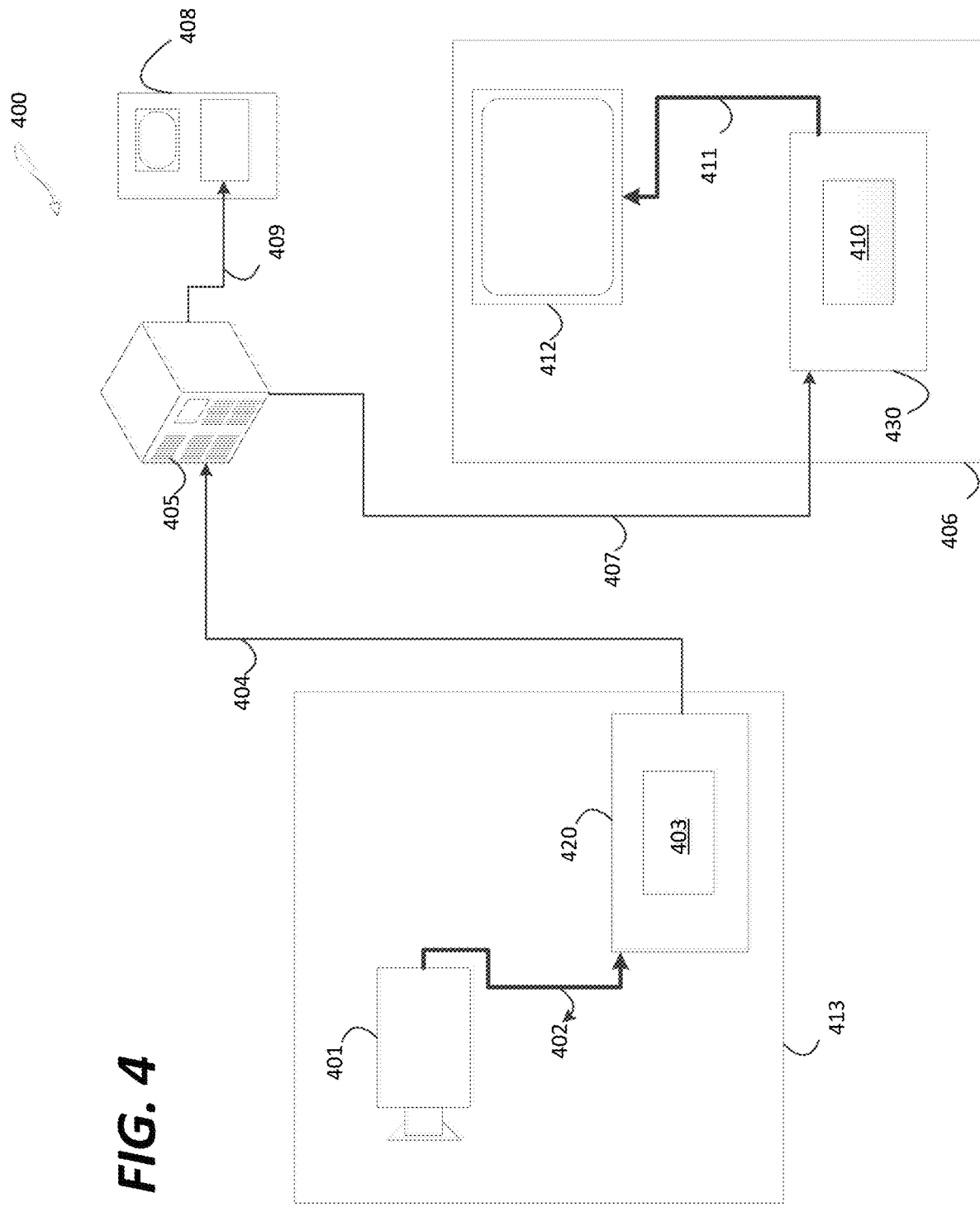
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
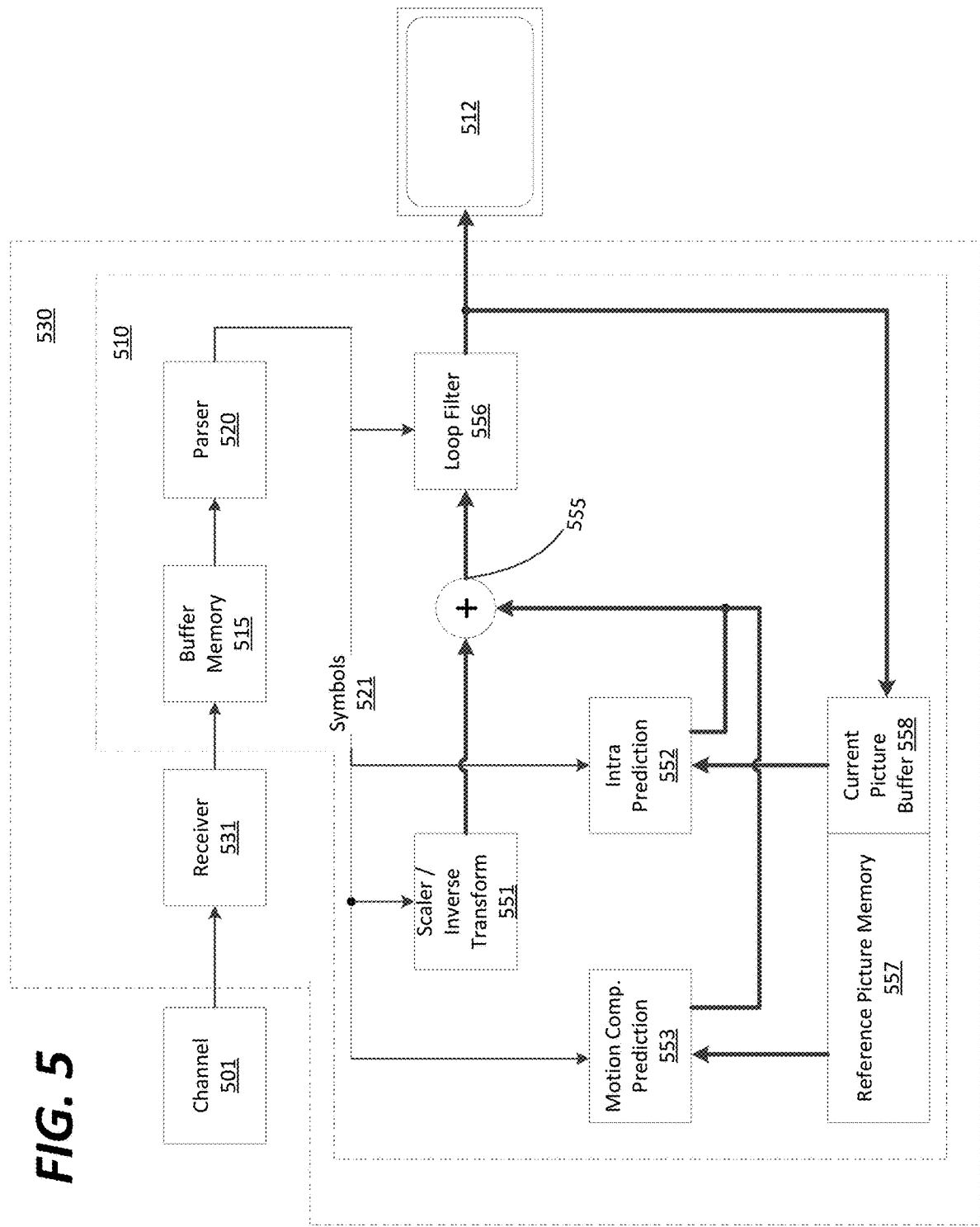
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
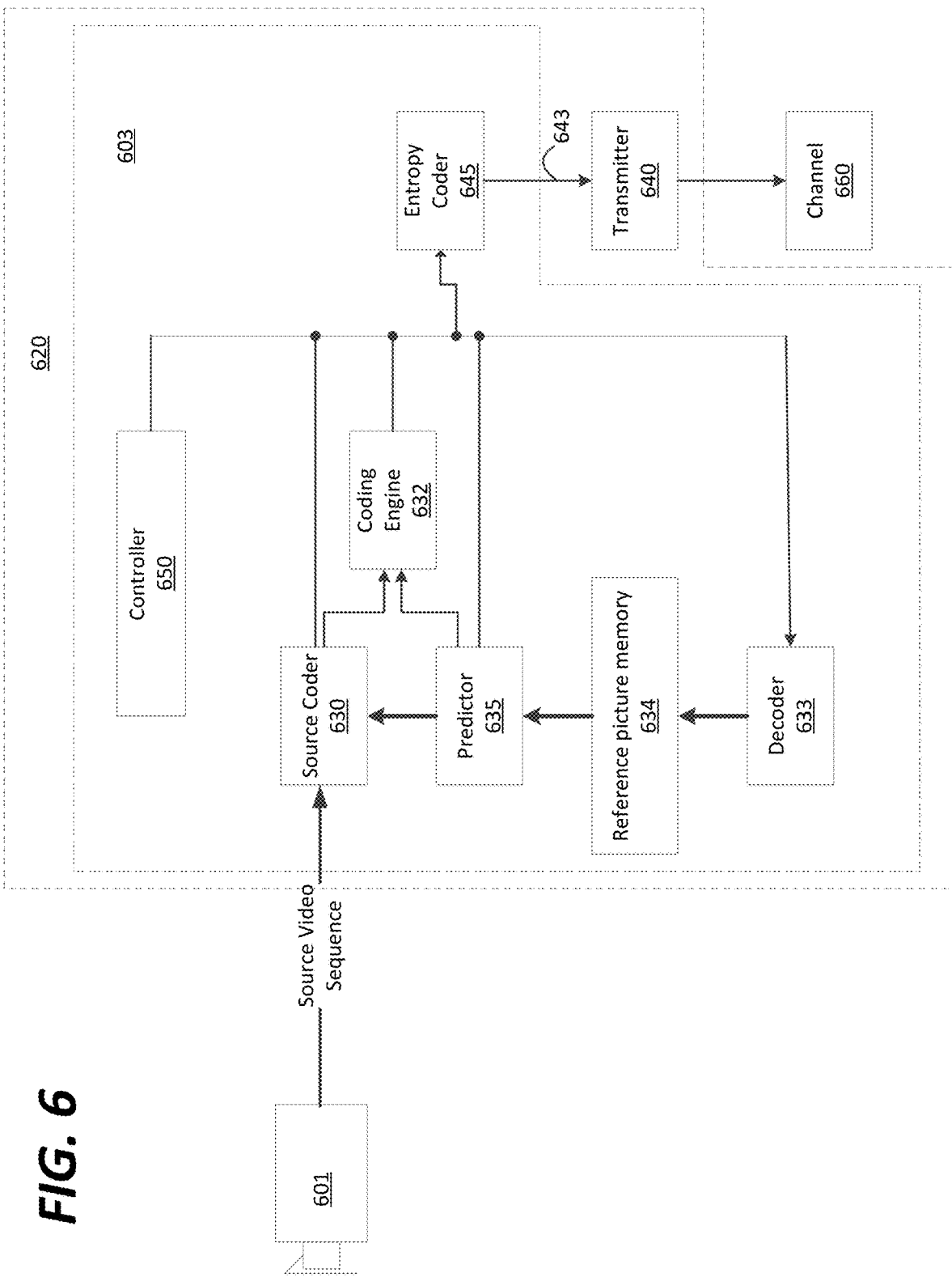
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
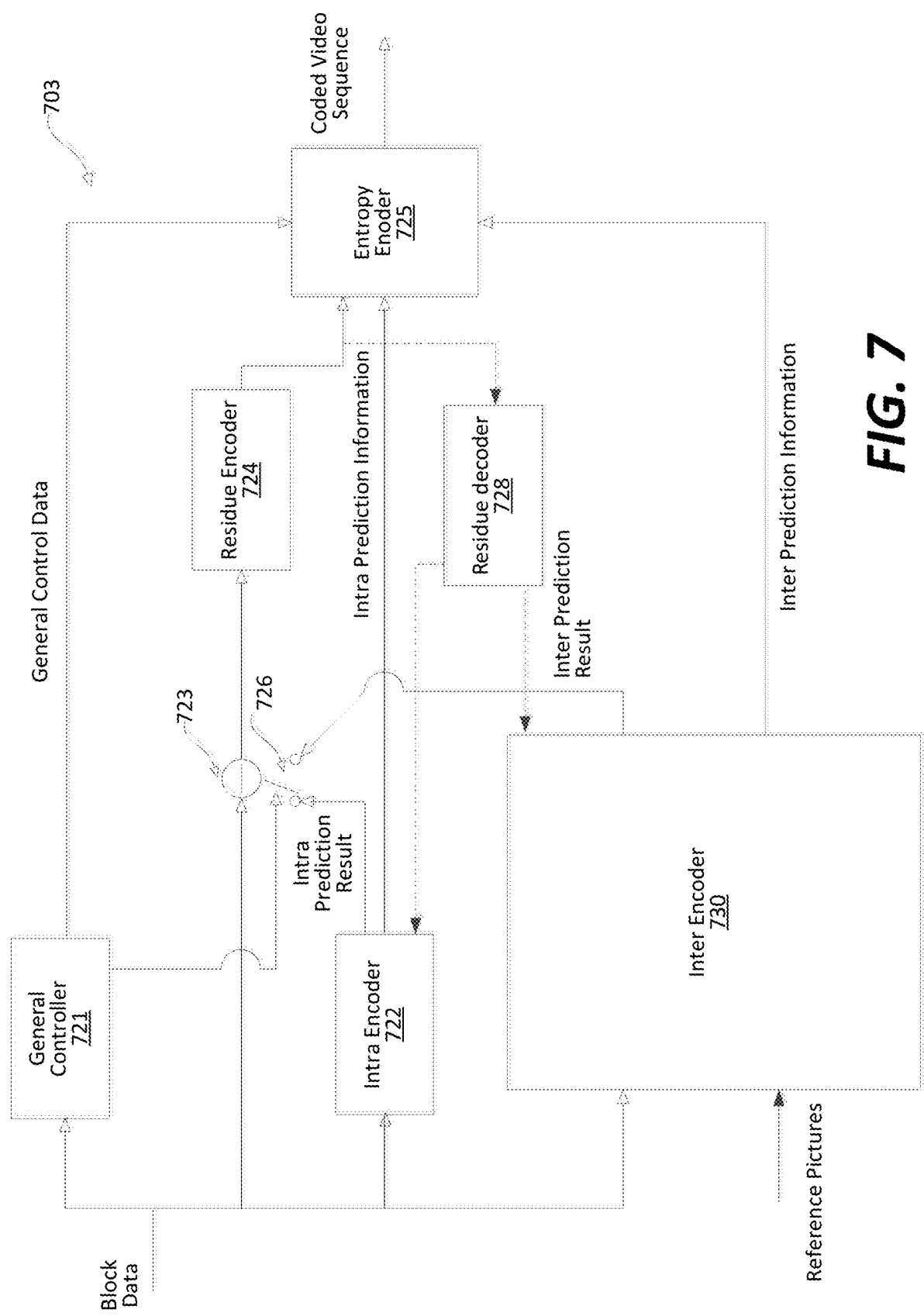
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data in the frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
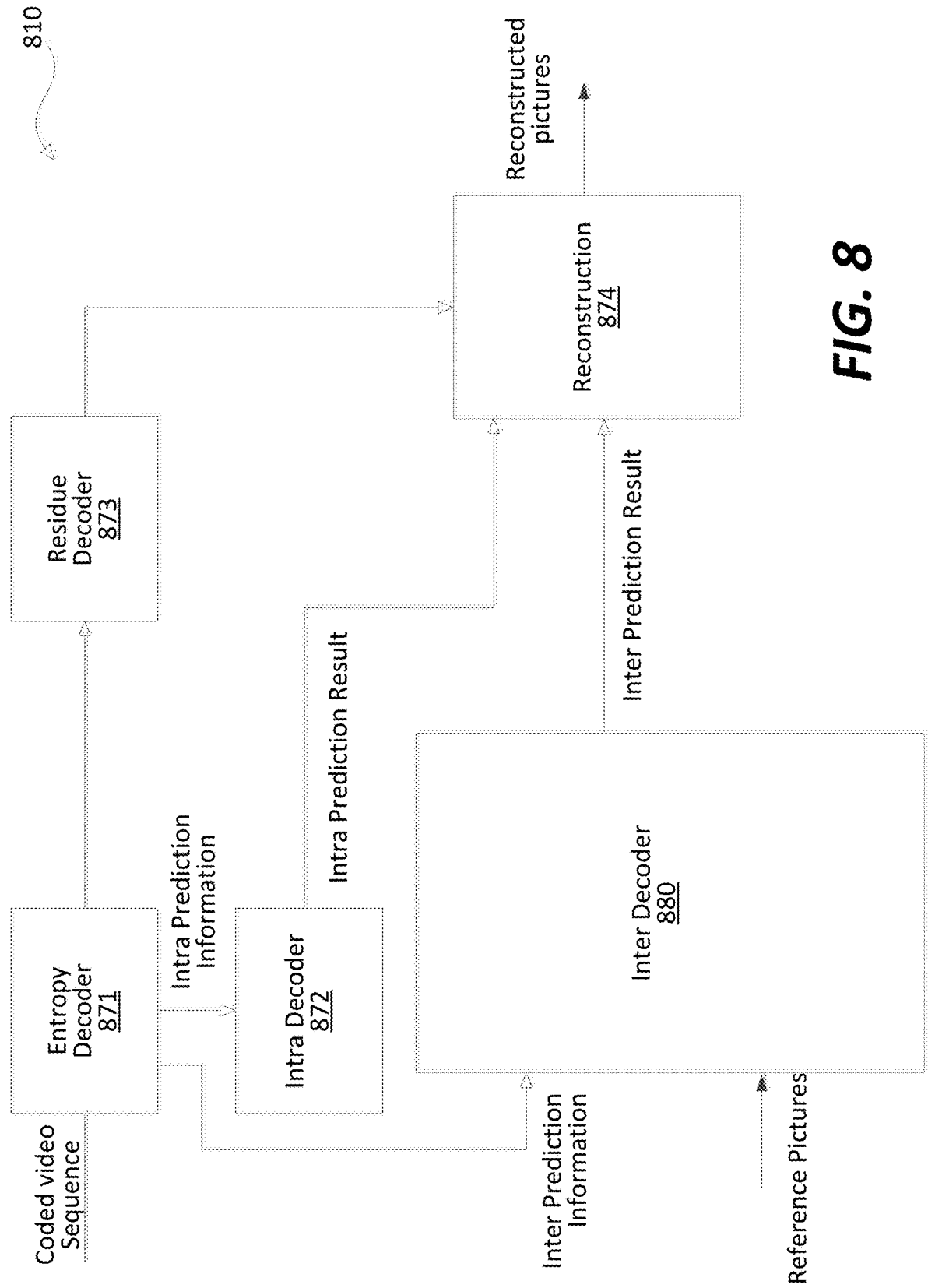
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques for intra picture block compensation.

Block based compensation from a different picture is referred to as motion compensation. Similarly, a block compensation can also be done from a previously reconstructed area within the same picture. The block based compensation from reconstructed area within the same pictures is referred to as intra picture block compensation, or intra block copy. A displacement vector that indicates the offset between the current block and the reference block in the same picture is referred to as a block vector (or BV for short). Different from a motion vector in motion compensation, which can be at any value (positive or negative, at either x or y direction), a block vector has a few constraints to ensure that the reference block is available and already reconstructed. Also, in some examples, for parallel processing consideration, some reference area that is tile boundary or wavefront ladder shape boundary is excluded.

The coding of a block vector could be either explicit or implicit. In the explicit mode, the difference between a block vector and its predictor is signaled; in the implicit mode, the block vector is recovered from a predictor (referred to as block vector predictor), in a similar way as a motion vector in merge mode. The resolution of a block vector, in some implementations, is restricted to integer positions; in other systems, the block vector is allowed to point to fractional positions.

In some examples, the use of intra block copy at block level, can be signaled using a reference index approach. The current picture under decoding is then treated as a reference picture. In an example, such a reference picture is put in the last position of a list of reference pictures. This special reference picture is also managed together with other temporal reference pictures in a buffer, such as decoded picture buffer (DPB).

There are also some variations for intra block copy, such as flipped intra block copy (the reference block is flipped horizontally or vertically before used to predict current block), or line based intra block copy (each compensation unit inside an M×N coding block is an M×1 or 1×N line).

Figure 9:
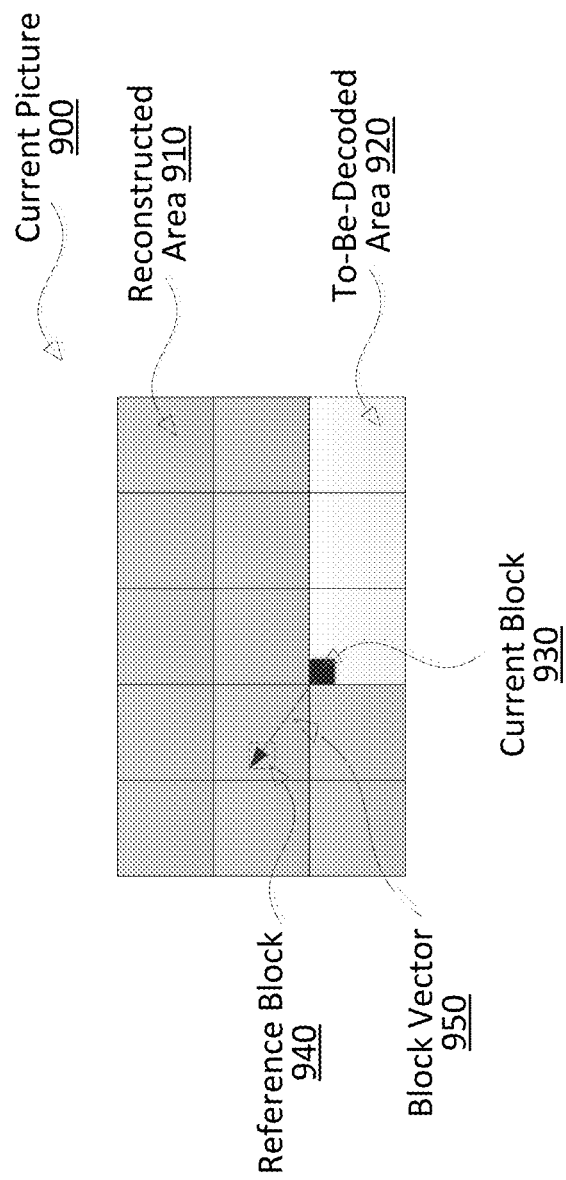
FIG. 9 shows an example of intra block copy according to an embodiment of the disclosure.

FIG. 9 shows an example of intra block copy according to an embodiment of the disclosure. Current picture (900) is under decoding. The current picture (900) includes a reconstructed area (910) (grey area) and to-be-decoded area (920) (white area). A current block (930) is under reconstruction by a decoder. The current block (930) can be reconstructed from a reference block (940) that is in the reconstructed area (910). The position offset between the reference block (940) and the current block (930) is referred to as a block vector (950) (or BV (950)).

Generally, a coding unit includes samples of both luma and chroma components. The samples of chroma component can have an independent or separate split tree structure as compared to the ones of luma component. Typically, such a separate coding tree structure starts from CTU level. Therefore, it is possible that a chroma CU (a CU that contains only two chroma components) can be larger than its luma counterpart at the corresponding sample location.

In some embodiments, block based motion compensation for all color components of a block share the same motion or block vector(s). When the separate coding tree is enabled, the luma-chroma sample correspondence at the same location may not be always associated. Sometimes a luma CU area may cover more than one chroma CU. Sometimes, a chroma CU area may cover more than one luma CU.

Some aspects of the present disclosure provide methods to properly apply the intra block copy techniques when luma-chroma separate coding tree is used. Specifically, the methods can perform BV derivation of chroma blocks in chroma coding tree, when the luma coding tree is separately coded ahead of coding of chroma coding tree.

According to an aspect of the disclosure, the property of a chroma CU is derived based on corresponding luma CU's intra block copy information. For each chroma CU, the co-located luma area can be used to determine whether the current chroma CU should be coded in intra block copy mode.

Figure 10:
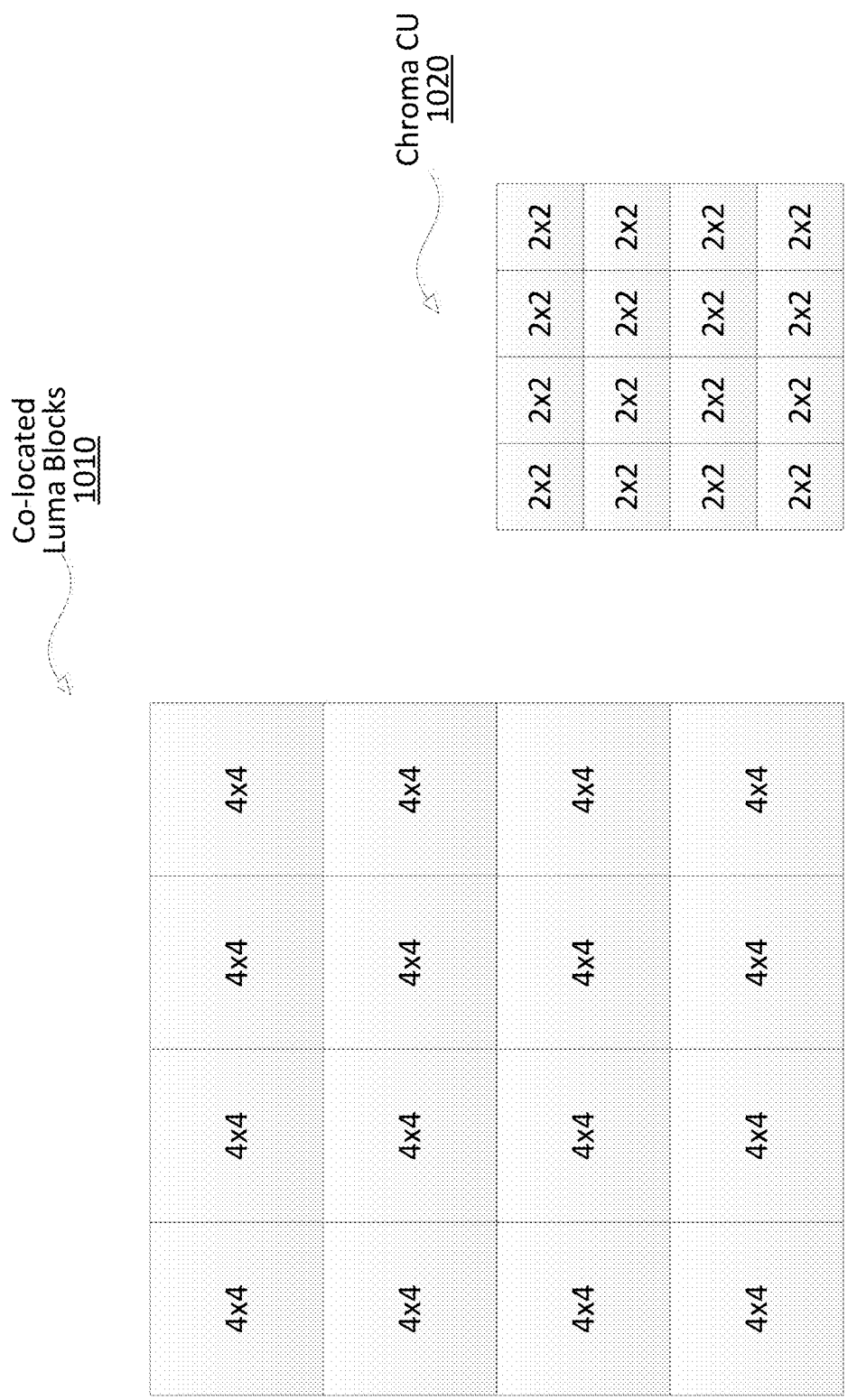
FIG. 10 shows an example of a chroma coding unit and a co-located luma units according to an embodiment of the disclosure.

FIG. 10 shows an example of a chroma CU (1020) and a co-located luma area (1010) in 4:2:0 format according to an embodiment of the disclosure. In the FIG. 10 example, the chroma CU (1020) is an 8×8 (samples) Chroma CU and the corresponding luma area (1010). The corresponding luma area (1010) includes 16×16 (samples) according to 4:2:0 format. In some embodiment, a coding unit is divided into smallest compensation units for compensation. For example, in the 4:2:0 format, the smallest compensation unit for luma has a size of 4×4 (samples), and is referred to as a luma unit; the smallest compensation unit for chroma has a size of 2×2 (samples), and is referred to as a chroma unit. Thus, when a coding unit is divided into the smallest compensation units, each smallest chroma unit will have its corresponding smallest luma unit at the luma-chroma co-located position. Therefore, a chroma CU has its co-located luma area, which is formed of a set of smallest luma units.

According to an aspect of the disclosure, the chroma CU can be selectively coded in the intra block copy mode based on a popularity of the intra block copy modes in the co-located luma area.

In a first case, the intra block copy modes are popular in the co-located luma area. In an example, all of the co-located smallest luma units are coded in intra block copy modes. In another example, a ratio of the number (or size) of the smallest luma units in intra block copy mode to the number (or size) of the smallest luma units in the co-located area, is above (or no smaller than) a first threshold. The first threshold may be predefined or signaled in bitstream, such as in SPS, PPS, or slice header.

When the intra block copy modes are popular, the status of current chroma CU can be derived based on the coding modes in the corresponding luma units. In an example, the current chroma CU shall also be coded in intra block copy mode, and the block vector for each of its smallest units (2×2 in the example) will be derived from the corresponding smallest luma unit. In another embodiment, when a chroma unit's associated luma unit is not in intra block copy mode, the block vector of the chroma unit is derived from spatially neighboring chroma units, such as the average of available neighboring chroma BVs, the median of available neighboring chroma BVs, or the same as the first available neighboring chroma BV.

In a second case, the intra block copy modes are not popular in the co-located luma area. In an example, none of the co-located smallest luma units is coded in intra block copy mode. In another example, the ratio of the number (or size) of the smallest luma units in intra block copy mode to the number (or size) of the smallest luma units in the co-located area, is below (or no larger than) a second threshold. The second threshold may be predefined or signaled in bitstream, such as in SPS, PPS, or slice header.

When the intra block copy modes are not popular in the co-located luma area, in an example, the current chroma CU shall not be coded in intra block copy mode. Then, the current chroma CU can be coded according to other available coding modes.

In a third case, a fraction (but not all) of the smallest luma units are coded in intra block copy mode. For example, the ratio of the number (or size) of the smallest luma units in intra block copy mode to the number (or size) of the smallest luma units in the co-located area is between the first threshold and the second threshold. In the third case, in an embodiment, the current chroma CU will be inferred to split further (given that the smallest chroma CU has not yet reached and the largest split depth has not yet reached) such that each of the sub-CU from the split can be evaluated in the first case or in the second case.

In the third cases, in another embodiment, the current chroma CU will have a flag to indicate if the current chroma CU should be split further (given that the smallest chroma CU has not yet reached and the largest split depth has not yet reached). When the split flag is "yes", for example, the current chroma CU is split further, and each of the sub-CU from the split can be evaluated in the first case or in the second case. If the split flag is indicative of "no" (or the max split depth is reached), in an example, the current chroma CU will not be split further. Then, the current chroma CU will not be coded in intra block copy mode. However, the current chroma Cu can be coded by other suitable coding mode from available coding modes.

In the third case, in another embodiment, the first coded BV from the corresponding luma area, will be used as the block vector for the current chroma CU. In another embodiment, the last coded BV from the corresponding luma area, will be used as the block vector for the current chroma CU. In another embodiment, a function (e.g., an average) of all the coded BVs from the corresponding luma area, will be used as the block vector for the current chroma CU.

In the third case, in another embodiment, the chroma smallest units are categorized into first chroma smallest units with corresponding luma units being coded in the intra block copy mode and second chroma smallest units with corresponding luma units not being coded in the intra block copy modes. The first chroma smallest units can be coded in intra block copy mode, with their BVs to be derived from the corresponding luma units.

The second chroma smallest units can be coded in various techniques. In an example, the second chroma smallest units will be coded in other available modes (such as intra mode). In particular, when the second chroma smallest units are coded in intra mode, all of the second chroma smallest units will share the same intra mode, and the prediction samples are generated from the neighboring reference samples of the chroma CU, not the neighboring reference samples of current chroma smallest unit. In an example, the intra mode is signaled at CU level. The set of possible modes can be different from general chroma intra prediction. In another example, the intra mode is chosen by default, such as DC mode or planar mode, or a mode that can be inferred.

In another example, the second chroma smallest units will be coded in intra block copy mode. For each of the second chroma smallest unit, a default (e.g., preset) BV is used.

Examples of such default (preset) BV can be, (−2×chroma_CU_width, 0), (−1×chroma_CU_width, 0), (−2×chroma_CU_width, −2×chroma_CU_height), (−1×chroma_CU_width, −1×chroma_CU_height), (0, −2×chroma_CU_height), (0, −1×chroma_CU_height), etc. The chroma_CU_width denotes the width of a current chroma CU, and throma_CU_height denotes the height of the current chroma CU. The default BV may also be signaled in bitstream such as in SPS, PPS, or slice header.

In another example, the second chroma smallest units will be coded in intra block copy mode. For each of the second chroma smallest units, its BV can be derived from its spatial neighboring chroma smallest units (if there is an immediate or further away neighbor unit is coded in intra block copy mode).

Figure 11:
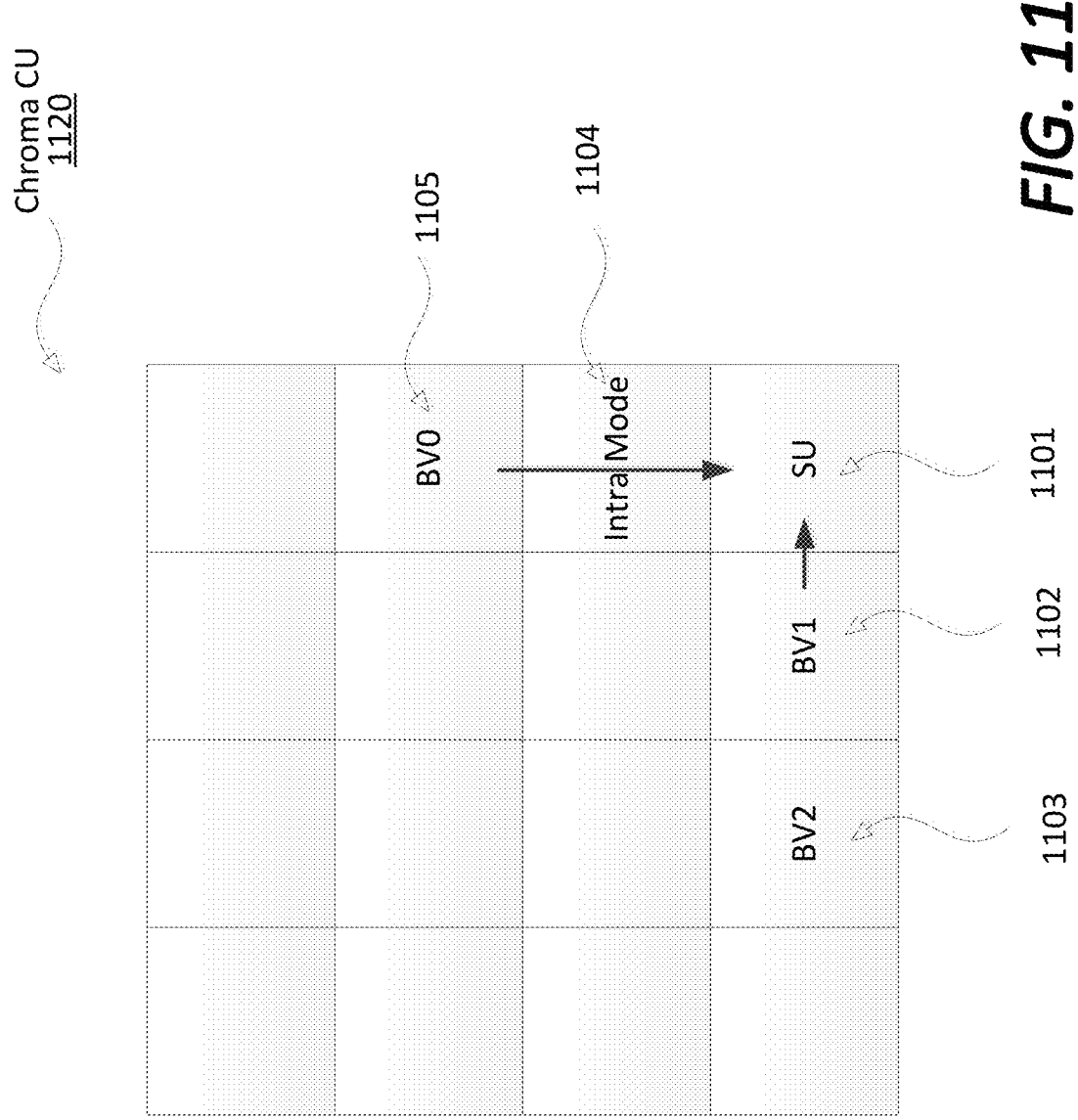
FIG. 11 shows an example for chroma block vector derivation from spatial neighbors according to an embodiment of the disclosure.

FIG. 11 shows an example for chroma BV derivation from spatial neighbors according to an embodiment of the disclosure. In the FIG. 11 example, the chroma CU (1120) includes a second chroma smallest unit (SU) (1101). The SU (1101) has an immediate neighbor unit (1102) that is coded in the intra block copy mode, and further away neighbor units (1103) and (1105) that are coded in the intra block copy mode. The SU (1101) has another immediate neighbor unit (1104) that is in the intra mode. In an example, the SU (1101) is coded in the intra block copy mode using BV1 that is derived from the immediate neighbor unit (1102). In another example, the SU (1101) is coded in the intra block copy mode using BV0 that is derived from the farther away neighbor unit (1105).

In another embodiment, the second chroma smallest units will be coded in intra block copy mode. For each of the second chroma smallest units, its BV can be derived from the last used chroma BV in the CTU. If a current chroma smallest unit is the first one in the CTU and its corresponding luma smallest unit is not coded in intra block copy mode, then a default/preset BV will be used. Examples of such default (preset) BV can be, (−2×chroma_CU_width, 0), (−1×chroma_CU_width, 0), (−2×chroma_CU_width, −2×chroma_CU_height), (−1×chroma_CU_width, −1×chroma_CU_height), (0, −2×chroma_CU_height), (0, −1×chroma_CU_height), etc. The default BV may also be signaled in bitstream such as in SPS, PPS, or slice header.

According to some aspects of the disclosure, the block vectors can be clipped to have a valid value that points to already reconstructed area within the same picture. For each chroma smallest unit, when the chroma smallest unit is coded in intra block copy mode, its BV should be a valid one, pointing to already reconstructed area within the same picture. When the derived BV is not a valid one for the current smallest unit, techniques can be used to clip the BV, such that the clipped BV has a valid value.

In an embodiment, the reference unit is moved horizontally (to the left) or vertically (to the top) towards a valid reference area. This can be done by reducing the value of either the x or y component of the BV until the BV becomes valid.

In another embodiment, the BV is replaced by a default (preset) BV. Examples of such default (preset) BV can be, (−2×chroma_CU_width, 0), (−1×chroma_CU_width, 0), (−2×chroma_CU_width, −2×chroma_CU_height), (−1×chroma_CU_width, −1×chroma_CU_height), (0, −2×chroma_CU_height), (0, −1×chroma_CU_height), etc.

Also, in some implementations, when a derived BV for chroma component is not at an integer position, a clipping (or rounding) operation can be performed to round the chroma BV to integer (at both x and y directions). In one embodiment, the chroma BV is rounded towards the nearest integer. In another embodiment, the chroma BV is rounded towards the smallest integer that is larger than the original chroma BV. In another embodiment, the chroma BV is rounded towards the largest integer that is smaller than the original chroma BV. In another embodiment, the chroma BV is rounded towards the zero value.

It is noted that, in the above descriptions, the color format of 4:2:0 is used. In a different color format other than 4:2:0, the size correspondence between a co-located chroma smallest unit and the corresponding luma smallest unit can be different. In general, all the methods disclosed above can be extended to other color formats with chroma component(s), such as 4:4:4 or 4:2:2.

Figure 12:
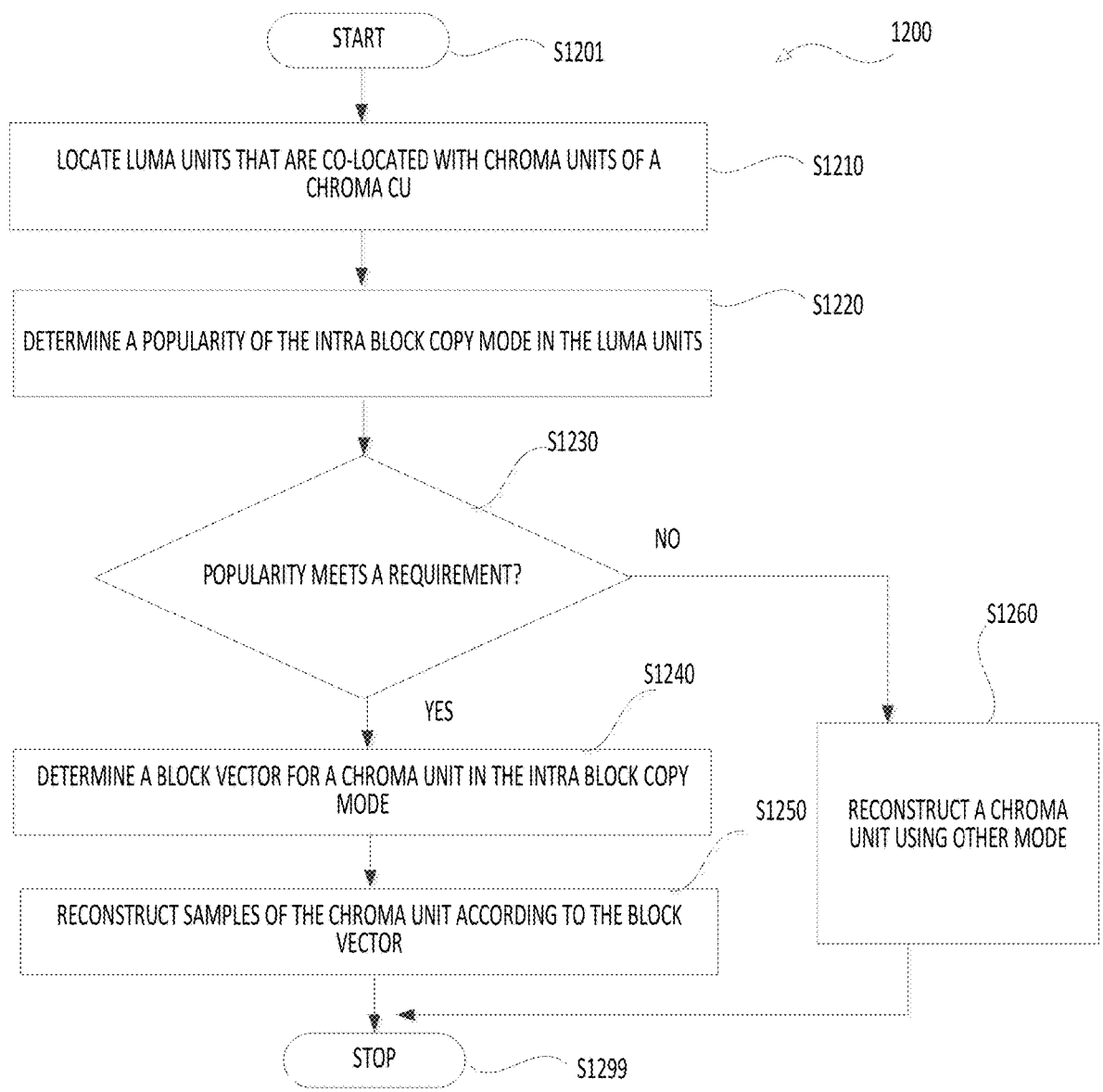
FIG. 12 shows a flow chart outlining a process according to an embodiment of the disclosure.

FIG. 12 shows a flow chart outlining a process (1200) according to an embodiment of the disclosure. The process (1200) can be used in the reconstruction of a block coded in intra mode, so to generate a prediction block for the block under reconstruction. In various embodiments, the process (1200) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the intra prediction module (552), the processing circuitry that performs functions of the video encoder (603), the processing circuitry that performs functions of the predictor (635), the processing circuitry that performs functions of the intra encoder (722), the processing circuitry that performs functions of the intra decoder (872), and the like. In some embodiments, the process (1200) is implemented in software instructions, thus when the processing circuitry executes the software instructions, the processing circuitry performs the process (1200). The process starts at (S1201) and proceeds to (S1210).

At (S1210), luma smallest units (referred to as luma units) that are co-located with chroma smallest units (referred to as chroma units) of a chroma CU are located.

At (S1220), a popularity of the intra block copy mode in the luma smallest units are determined.

At (S1230), when the popularity meets a popularity requirement (e.g., larger than a first threshold), the process proceeds to (S1240); otherwise, the process proceeds to (S1260).

At (S1240), a block vector for a chroma unit in the intra block copy mode is determined.

At (S1250), samples of the chroma unit are reconstructed based on the block vector. Then, the process proceeds to (S1299) and terminates.

At (S1260), samples of the chroma unit are reconstructed based on a suitable mode other than the intra block copy mode. Then, the process proceeds to (S1299) and terminates.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
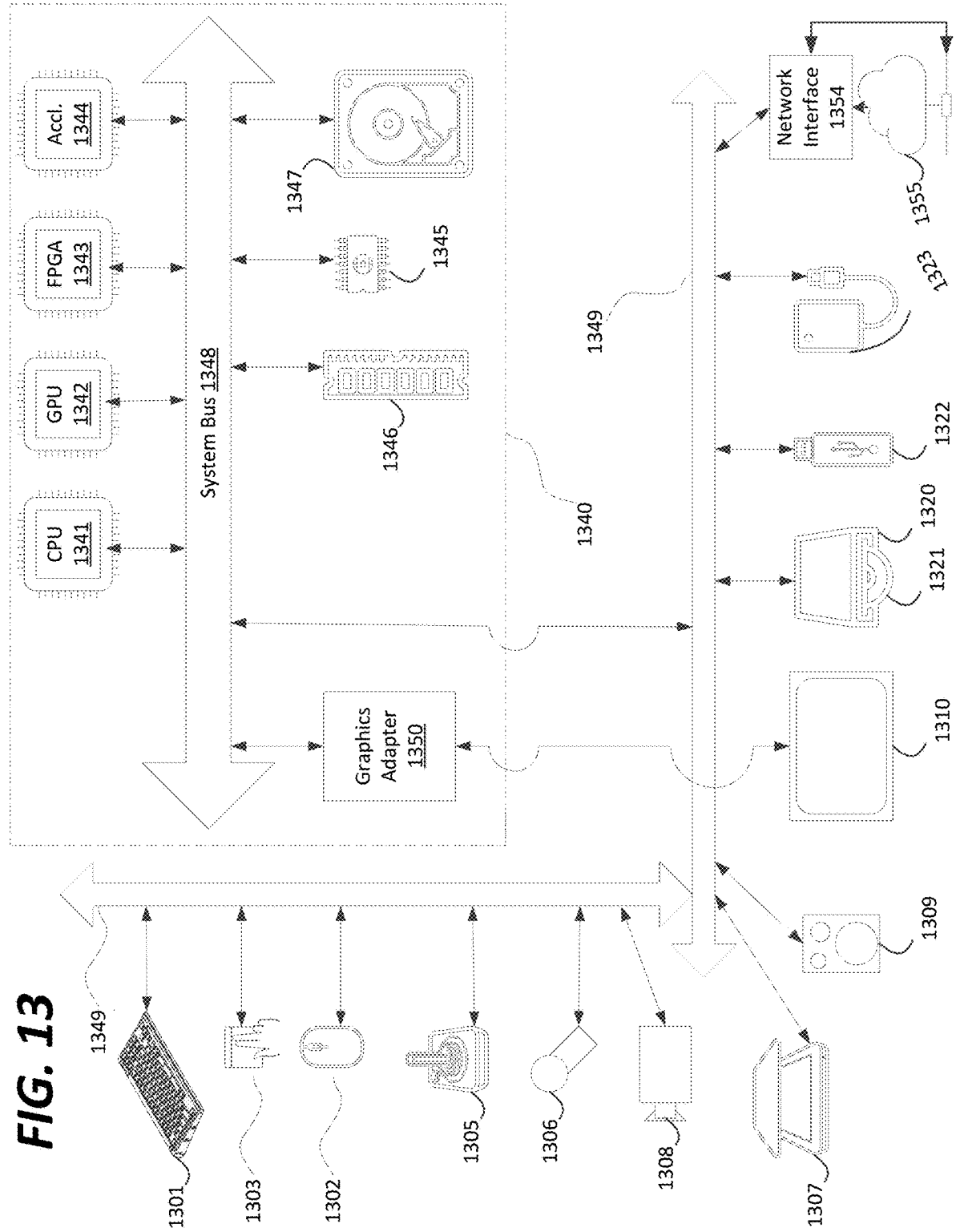
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, comprising:
   locating luma units of a plurality of luma coding units that are co-located with chroma units of a plurality of chroma coding units;
   determining, for each of the plurality of luma coding units, a ratio of (i) a number of smallest luma units to be coded in an intra block copy mode to (ii) a total number of smallest luma units in a respective co-located luma coding unit of the plurality of luma coding units;
   determining a block vector for a chroma unit of each of the plurality of chroma coding units having the respective co-located luma coding unit of the plurality of luma coding units with the determined ratio greater than a first threshold based on one or more block vectors of the luma units of the respective co-located luma coding unit, the first threshold corresponding to a plurality of luma units to be coded in the intra block copy mode;
   encoding, for each chroma unit having the determined block vector, at least one sample of the respective chroma unit according to the block vector determined for the respective chroma unit; and
   encoding, for a chroma unit of each of the plurality of chroma coding units having the respective co-located luma coding unit of the plurality of luma coding units with the determined ratio less than or equal to the first threshold, at least one sample of the respective chroma unit in accordance with a coding mode that is not the intra block copy mode.

2. The method of claim 1, wherein the determining the block vector for the chroma unit of each of the plurality of chroma coding units having the respective co-located luma coding unit of the plurality of luma coding units with the determined ratio greater than the first threshold is based on the luma units of the respective co-located luma coding unit of the plurality of luma coding units when all the luma units of the respective co-located luma coding unit of the plurality of luma coding units are to be coded in the intra block copy mode.

3. The method of claim 2, further comprising:
   locating a specific luma unit that is co-located with a specific chroma unit; and
   determining a block vector that is associated with the specific luma unit for the specific chroma unit.

4. The method of claim 1, wherein the determining the block vector for the chroma unit of the chroma coding unit of each of the plurality of chroma coding units having the respective co-located luma coding unit of the plurality of luma coding units with the determined ratio greater than the first threshold is based on the luma units of the respective co-located luma coding unit of the plurality of luma coding units.

5. The method of claim 4, further comprising:
   when a specific luma unit that is co-located with a specific chroma unit is to be coded in the intra block copy mode, associating a block vector of the specific luma unit with the specific chroma unit.

6. The method of claim 5, further comprising:
   when the specific luma unit that is co-located with the specific chroma unit is to be coded in a mode other than the intra block copy mode, determining a block vector for the specific chroma coding unit according to a neighboring chroma unit of the specific chroma unit.

7. The method of claim 4, further comprising:
including the first threshold in at least one of sequence parameter set (SPS), picture parameter set (PPS), or slice header.

8. The method of claim 1, further comprising:
disabling the intra block copy mode for each chroma coding unit of the plurality of chroma coding units having the respective co-located luma coding unit with the determined ratio less than a second threshold that is less than the first threshold.

9. The method of claim 4, further comprising:
determining whether at least one of the luma units of a luma coding unit of the plurality of luma coding units is not to be coded in the intra block copy mode; and
disabling the intra block copy mode for a co-located chroma coding unit of the plurality of chroma coding units in response to the determination that at least one of the luma units of the luma coding unit of the plurality of coding units is not to be coded in the intra block copy mode.

10. The method of claim 1, further comprising:
splitting a chroma coding unit of the plurality of chroma coding units into chroma coding sub-units when a non-intra block copy mode is to be used for the luma units of a co-located luma coding unit of the plurality of luma coding units; and
determining whether the respective chroma coding sub-units are encodable using the intra block copy mode.

11. The method of claim 10, further comprising:
generating a splitting flag associated with a chroma coding unit of the plurality of chroma coding units, the splitting flag indicating that the chroma coding unit of the plurality of chroma coding units is to be split into the chroma coding sub-units.

12. A video encoder apparatus for video decoding, comprising:
processing circuitry configured to:
locate luma units of a plurality of luma coding units that are co-located with chroma units of a plurality of chroma coding units,
determine, for each of the plurality of luma coding units, a ratio of (i) a number of smallest luma units to be coded in an intra block copy mode to (ii) a total number of smallest luma units in a respective co-located luma coding unit of the plurality of luma coding units,
determine a block vector for a chroma unit of each of the plurality of chroma coding units having the respective co-located luma coding unit of the plurality of luma coding units with the determined ratio greater than a first threshold based on one or more block vectors of the luma units of the respective co-located luma coding unit, the first threshold corresponding to a plurality of luma units to be coded in the intra block copy mode,
encode, for each chroma unit having the determined block vector, at least one sample of the respective chroma unit according to the block vector determined for the respective chroma unit, and
encode, for a chroma unit of each of the plurality of chroma coding units having the respective co-located luma coding unit of the plurality of luma coding units with the determined ratio less than or equal to the first threshold, at least one sample of the respective chroma unit in accordance with a coding mode that is not the intra block copy mode.

13. The video encoder apparatus of claim 12, wherein the determination of the block vector for the chroma unit of each of the plurality of chroma coding units having the respective co-located luma coding unit of the plurality of luma coding units with the determined ratio greater than the first threshold is based on the luma units of the respective co-located luma coding unit of the plurality of luma coding units when all the luma units of the respective co-located luma coding unit of the plurality of luma coding units are to be coded in the intra block copy mode.

14. The video encoder apparatus of claim 13, wherein the processing circuitry is further configured to:
locate a specific luma unit that is co-located with a specific chroma unit, and
determine a block vector that is associated with the specific luma unit for the specific chroma unit.

15. The video encoder apparatus of claim 12, wherein the determination of the block vector for the chroma unit of the chroma coding unit of each of the plurality of chroma coding units having the respective co-located luma coding unit of the plurality of luma coding units with the determined ratio greater than the first threshold is based on the luma units of the respective co-located luma coding unit of the plurality of luma coding units.

16. The video encoder apparatus of claim 15, wherein the processing circuitry is further configured to:
when a specific luma unit that is co-located with a specific chroma unit is to be coded in the intra block copy mode, associate a block vector of the specific luma unit with the specific chroma unit.

17. The video encoder apparatus of claim 16, wherein the processing circuitry is further configured to:
when the specific luma unit that is co-located with the specific chroma unit is to be coded in a mode other than the intra block copy mode,
determine a block vector for the specific chroma coding unit according to a neighboring chroma unit of the specific chroma unit.

18. The video encoder apparatus of claim 15, wherein the processing circuitry is further configured to:
include the first threshold in at least one of sequence parameter set (SPS), picture parameter set (PPS), or slice header.

19. The video encoder apparatus of claim 12, wherein the processing circuitry is further configured to:
disable the intra block copy mode for each chroma coding unit of the plurality of chroma coding units having the respective co-located luma coding unit with the determined ratio less than a second threshold that is less than the first threshold.

20. A non-transitory computer readable medium having instructions stored therein, which when executed by a processor in a video encoder causes the processor to execute a method comprising:
locating luma units of a plurality of luma coding units that are co-located with chroma units of a plurality of chroma coding units;
determining, for each of the plurality of luma coding units, a ratio of (i) a number of smallest luma units to be coded in an intra block copy mode to (ii) a total number of smallest luma units in a respective co-located luma coding unit of the plurality of luma coding units;
determining a block vector for a chroma unit of each of the plurality of chroma coding units having the respective co-located luma coding unit of the plurality of luma coding units with the determined ratio greater than a first threshold based on one or more block vectors of the luma units of the respective co-located luma coding unit, the first threshold corresponding to a plurality of luma units to be coded in the intra block copy mode;

encoding, for each chroma unit having the determined block vector, at least one sample of the respective chroma unit according to the block vector determined for the respective chroma unit; and encoding, for a chroma unit of each of the plurality of chroma coding units having the respective co-located luma coding unit of the plurality of luma coding units with the determined ratio less than or equal to the first threshold, at least one sample of the respective chroma unit in accordance with a coding mode that is not the intra block copy mode.

* * * * *